United States Patent Office 3,629,323
Patented Dec. 21, 1971

3,629,323
ALKYL ESTERS OF 2-HYDROXY-2-ALKOXY
3,3,3-TRIFLUOROPROPANOIC ACID
Stanley Selman, Wilmington, Del., and Edward N. Squire,
Glen Mills, Pa., assignors to E. I. du Pont de Nemours
and Company, Wilmington, Del.
No Drawing. Original application Mar. 12, 1968, Ser. No.
724,308, now Patent No. 3,502,732, dated Mar. 24,
1970, which is a division of application Ser. No.
488,247, Sept. 17, 1965. Divided and this application
Apr. 23, 1969, Ser. No. 840,880
Int. Cl. C07c 69/66
U.S. Cl. 260—484 R             2 Claims

ABSTRACT OF THE DISCLOSURE

Compounds of the formulas

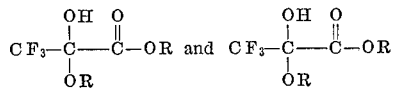

wherein R is alkyl containing up to 30 carbon atoms, can be prepared by reacting perfluoropyruvyl fluoride with a saturated hydrocarbon alcohol and an HF scavenger to neutralize HF and isolating

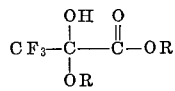

then reacting the

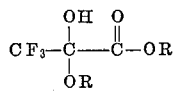

with an alkali metal alkoxide and a dialkyl sulfate containing up to 30 carbon atoms and isolating

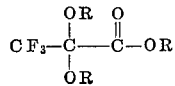

This application is a division of U.S. patent application Ser. No. 724,308, filed Mar. 12, 1968, now U.S. Pat. 3,502,732 which is a division of U.S. patent application Ser. No. 488,247, filed Sept. 17, 1965, now U.S. Pat. 3,480,603, both of which are by the same inventors.

The novel monomers of this invention are difluoroketene dialkyl acetals, which are represented by the formula

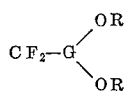

wherein each R is the same or different alkyl group. The carbon content of the alkyl groups is not critical and each group may contain up to 30 or more carbons. However, for convenience and availability of reactants, the alkyl groups are preferably of 1 to 8 carbon atoms each, and most preferably, each alkyl group is methyl. Examples of R groups include methyl, ethyl, propyl, hexyl, decyl, octadecyl, and the like.

The monomers are prepared by reacting prefluoropyruvyl fluoride or its dimer with an alcohol (ROH) in the presence of a base which consumes the HF produced to form the novel intermediate, the alkyl ester of 2-hydroxy-2-alkoxy-3,3,3-trifluoropropanoic of the formula

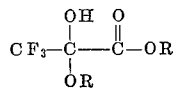

treating this intermediate product with an alkali metal alkoxide and dialkyl sulfate to form the novel intermediate, the alkyl ester of 2,2-dialkoxy-3,3,3-trifluoropropanoic acid of the formula

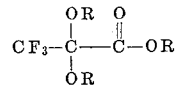

isolating this intermediate and treating it with a base, followed by pyrolysis to difluoroketene dialkyl acetal. The meaning of R in the formulae of the novel intermediates is the same as given above.

The invention also includes polymers of the difluoroketene dialkyl acetals, including homopolymers and copolymers with tetrafluoroethylene. These polymers thus contain structural units of the formula

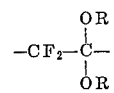

wherein R is as defined as above.

The preparation of the novel intermediates and monomers can be depicted as follows:

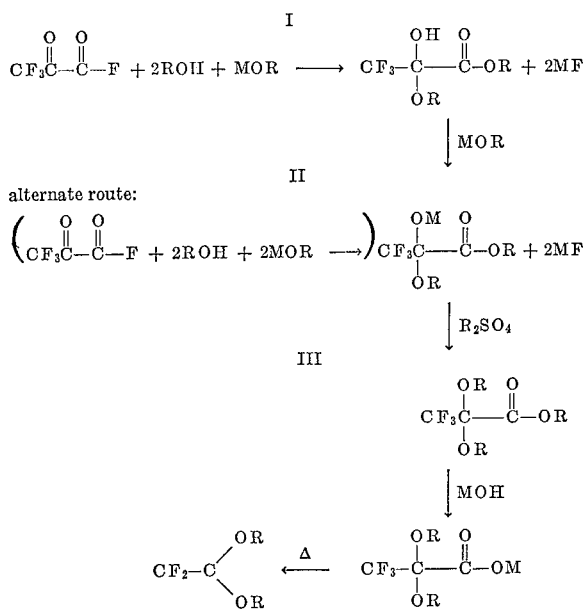

M represents an alkali metal, such as lithium, sodium, potassium, cesium and the like.

The perfluoropyruvyl fluoride is preferably added slowly to a mixture of the alcohol and the base MOR at about −80° C., and the mixture brought to room temperature to produce compound I which is the first mentioned novel intermediate of this invention. However, temperatures ranging from about −80° C. to about 40° C. can be employed. Pressure is not critical.

Compound I is then added to an equivalent amount of the alkoxide MOR, preferably dissolved in an alcohol ROH, over a temperature range of −80° C. to 40° C., and then heated at 20°–60° C. to produce compound II. After cooling compound II to −20 to +20° C., a dialkyl sulfate is added to produce compound III which is the second mentioned novel intermediate of this invention. Compound II is also novel but is not claimed herein.

If two equivalents of the alkoxide are employed initially as shown, compound II is obtained, and the dialkyl sulfate can be added directly to the reaction pot to obtain compound III.

The dialkoxy ester III can then be saponified with an alkali metal hydroxide by well-known procedures to obtain the alkali metal salt of 2,2-dialkoxy-3,3,3-trifluoropropionic acid (compound I), for if an excess of the alkoxide is present when compound II is formed, degradation of compound II may occur upon heating. The amount of the alkoxide can be controlled more easily by isolating compound I before adding the second equivalent of the alkoxide.

Instead of using an alkali metal alkoxide to remove HF, any base or HF scavenger can be used to react with it. Such scavengers include, e.g., alkali metal fluorides, such as sodium fluoride; amines, such as triethyl amine and the like. The dimer of perfluoropyruvyl fluoride can be used in place of perfluoropyruvyl fluoride to form the acetals of this invention.

Difluoroketene dimethyl acetal can alternatively be prepared by reacting sodium methoxide with tetrafluoroethylene in a solvent inert to the reactants and products at temperatures of 0–50° C. The difluoroketene dialkyl acetals can be isolated by fractional distillation.

The compounds alkyl ester of 2-hydroxy-2-alkoxy and 2,2-dialkoxy-3,3,3-trifluoropropanoic acid, are new classes of fluoro-hydrocarbon compounds These compounds. are stable, high boiling liquids. They are useful, for example, as intermediates, one to prepare the other in the order named and to ultimately prepare corresponding difluoroketene dialkyl acetals as previously described. Generally, the ester alkyl group will correspond to at least one of the 2-alkoxy substituents. Different alkoxy substituents for compound III and its acetal derivative are obtained by employing mixed alcohols to react with perfluoropyruvyl fluoride or by employing a dialkyl sulfate having a different alkyl group than the R group of the alcohol The difluoroketene dialkyl acetals readily homopolymerize. Therefore, it is desirable to isolate the monomer in a slightly impure form to prevent inadvertent homopolymerization.

Both homo- and copolymerization of the monomer is carried out by free radical initiation. The polymerization is carried out in conventional fashion; namely, in solution, emulsion, or in bulk, at temperatures ranging from −80° C. to +200° C., in a sealed container with an inert atmosphere and in the presence of a free radical initiator. The polymerization time, temperature, the particular initiator and its amount, the presence or absence of chain-transfer agents can all be varied in conventional manner to obtain the desired degree of monomer conversion and molecular weight. Pressure is not critical.

Suitable initiators are those used for the free radical polymerization of unsaturated compounds. A perfluorinated initiator, such as nitrogen difluoride, $N_2F_2$ or perfluoropropionyl peroxide, is preferred to avoid terminal groups containing hydrocarbon residues. Other initiators include peroxides, hydroperoxides, peracids, peresters, and azo compounds. In the case of peroxides and hydroperoxides, the preferred initiators have at least one tertiary carbon atom attached directly to the peroxide grouping, for example, di-α-cumyl peroxide, α-cumyl hydroperoxide, di-t-butyl peroxide, and the like. Other suitable initiators include benzoyl peroxide, lauroyl peroxide, bis-p-chlorobenzoyl peroxide, bis-2-dichlorobenzoyl peroxide, di-1-naphthoyl peroxide, t-butyl perbenzoate, cyclohexyl hydroperoxide, diisopropyl peroxy dicarbonate, acetyl peroxide, azo-bis-isobutyronitrile, and the like. Polymerization can also be initiated by molecular oxygen or ultraviolet radiation.

The homopolymer is a thermoplastic, normally a high molecular weight solid and can be formed into shaped articles and tough, stiff films which are useful in commerce in the manner as other plastics fabricated into such shapes. The monomers of this invention can be also copolymerized with the tetrafluoroethylene by free radical initiation.

The following examples are illustrative of the monomers and polymers of this invention. Parts and percents are by weight unless otherwise indicated.

EXAMPLE I

Methyl ester of 2-hydroxy-2-methoxy-3,3,3-trifluoropropanoic acid

Into a 30 ml. flask equipped with a magnetic stirrer, distillation column and head, was placed solution of 27 g. of sodium methoxide in 150 ml. of methanol. The contents of the flask were chilled to −80° C. and 72 g. of perfluoropyruvyl fluoride dimer added slowly. The mixture was brought to room temperature and then heated to remove the methanol. The methyl ester of 2-hydroxy-2-methoxy-3,3,3-trifluoropropanoic acid was obtained by distillation, B.P. 60° C. at 15 mm., in 88% yield.

*Analysis.*—Calcd. for $C_5H_7F_3O_4$ (percent): C, 31.9; F, 30.3; H, 3.7. Found (percent): C, 32.0; F, 29.2; H, 3.8.

Alternatively, methanol was added to the perfluoropyruvyl fluoride dimer in a 4:1 molar ratio at −80° C. and the stirred solution brought to room temperature. One mole of sodium fluoride was added to react with the HF which was formed and the methyl ester of 2-hydroxy-2-methoxy-3,3,3-trifluoropropanoic acid was obtained by distillation.

EXAMPLE II

Methyl ester of 2,2-dimethoxy-3,3,3-trifluoropropanoic acid

A 500 ml. flask, equipped with a magnetic stirrer, a distillation column and a head, was charged with 250 ml. of methanol. 36 g. of sodium methoxide was added with stirring and the mixture cooled to 0° C. 107 g. of the methyl ester of 2-hydroxy-2-methoxy-3,3,3-trifluoropropanoic acid was then introduced. The mixture was brought to room temperature and after 30 minutes, the temperature was raised to 40° C. and stirring continued for another 2 hours. The mixture was cooled to 0° C. and 84 g. of dimethyl sulfate introduced. Then the reaction mixture was heated and about 200 ml. of methanol was distilled off. The resulting reaction mixture was cooled to 0° C. and about 200 ml. of an ice water mixture added. After separation in a separatory funnel, the product was extracted three times with 100 ml. portions of cold water, dried over anhydrous sodium sulfate and then distilled to yield 104 g. of the methyl ester of 2,2-dimethoxy-3,3,3-trifluoropropanoic acid, B.P. 74° C. at 31 mm.

*Analysis.*—Calcd. for $C_6H_9O_4F_3$ (percent): C, 35.64; H, 4.46; F, 28.22. Found (percent): C, 35.61; H, 4.46; F, 27.97.

EXAMPLE III

Difluoroketene dimethyl acetal

Into a 100 ml. flask equipped with a magnetic stirrer and short column, was placed 5.6 g. of potassium hydroxide in 10 ml. of water and 30 ml. of methanol. The solution was stirred and 20.2 g. of the methyl ester of 2,2-dimethoxy-3,3,3-trifluoropropanoic acid added slowly. After the exothermic reaction, methanol and water were removed from the resulting potassium salt by evacuating flask by gentle heating in vacuo.

2 g. portions of the dried potassium salt were then pyrolyzed at 260–300° C. to yield difluoroketene dimethyl acetal, B.P. 78.5° C., M.P. −67° C., in 90–99% yield. Both $F^{19}$ and proton NMR spectra as well as infrared spectroscopy confirmed the structure.

EXAMPLE IV

Homopolymerization of difluoroketene dimethyl acetal 0.5 ml. of difluoroketene dimethyl acetal was placed in an 8 in., 8 mm. tube at −80° C. and $2.7 \times 10^{-}$ g. of a cis, trans mixture of $N_2F_2$ added. The tube was sealed and allowed to stand at room temperature for 16 hours. Upon opening the tube, 0.65 g. of the white, solid homopolymer was obtained.

*Analysis.*—Calcd. for $(C_4H_6F_2O_2)_n$ (percent): C, 38.71; H, 4.84; F, 30.6. Found (percent): C, 38.56; H, 4.67; F, 30.8.

The polymer was pressed at 200° C. to yield a stiff film.

EXAMPLE V

Copolymerization of difluoroketene dimethyl acetal and tetrafluoroethylene

Into a 30 ml. Carius tube was charged 15 ml. of t-butanol, 0.01 g. of azobisisobutyronitrile, 1 ml. of difluoroketene dimethyl acetal, and 3 ml. of tetrafluoroethylene. The tube was sealed and heated at 75° C. for 16 hours, followed by 1 hour at 110° C. After cooling to 0° C., the tube was opened and the polymer was separated and dried. By analysis the polymer contained 26.4 weight percent of difluoroketene dimethyl acetal monomer units and 73.6 weight percent of tetrafluoroethylene units. The polymer was pressed at 300° C. to yield a stiff film.

EXAMPLE VI

Ethyl ester of 2-hydroxy-2-ethoxy-3,3,3-trifluoropronanoic acid (A) Into a flask equipped as in Example I was placed 35 gm. of sodium ethoxide and 150 ml. of absolute ethanol. After the sodium ethoxide dissolved, the solution was chilled to −80° C. and 72 gm. of perfluoropyruvyl fluoride dimer was added. The mixture was warmed to room temperature and the product was distilled at 2 mm. pressure and 38° C. 110 g. of the above-named ester were obtained. Infrared spectroscopy showed absorbencies (in $\mu$) at 2.9, 3.4, 5.75, 6.8, 6.9, 7.3, 8.0, 8.4, 8.7, 9.0, 9.8, 10.1, 11.6 and 13.6.

(B) Into a flask equipped as in Example I, was placed 23 g. of sodium metal and 250 ml. of absolute ethanol, and 144 g. of perfluoropyruvyl fluoride dimer was added at −80° C. After warming to room temperature, the product was distilled at 2 mm. pressure and 38° C. The product was identified by $F^{19}$ and proton NMR and by infrared analysis.

EXAMPLE VII

Ethyl ester of 2,2-diethoxy-3,3,3-trifluoropropanoic acid 5.75 g. of sodium metal and 220 ml. of absolute ethanol were stirred in a 300 ml. flask equipped with a side arm, distillation column and head, and the flask cooled to −80° C. whereupon 54 gm. of the product of Example VI were slowly added. The stirred solution was heated to about 50° C. for about 4 hours and then chilled to −80° C. Diethyl sulfate was added and the mixture was then brought to room temperature. After distillation at about 34–35° C. at atmospheric and slightly below atmospheric pressure to remove impurities, ice was added and the ethyl ester named above was separated.

After drying over anhydrous sodium sulfate, the product was distilled at 35° C. and about 1 mm. pressure.

*Analysis.*—Calcd. for $C_9H_{15}F_3O_4$ (percent): C, 44.26; H, 6.19; F, 23.24. Found (percent): C, 44.10; H, 6.15; F, 23.70.

EXAMPLE VIII

Difluoroketene diethyl acetal 22.7 g. of the product of Example VII were added to 6.5 gm. of potassium hydroxide in a mixture of 10 ml. of water and 30 ml. of ethanol at −80° C. The mixture was warmed to room temperature and stirred for 3 hours. The liquids were stripped off under vacuum and the potassium salt dried at 60° C. 22.2 g. of the salt were obtained.

Samples of the potassium salt were pyrolyzed at 410° C. and 420° C., respectively, in a pyrolysis train under vacuum. The product was collected in a Dry Ice bath. Infrared and NMR data confirmed the structure corresponding to difluoroketene diethyl acetal, B.P. 108° C., M.P. −149° C.

Upon standing in a closed glass tube for about 2 weeks, the monomer forms a white solid polymer. Infrared analysis of the polymer showed major absorbencies (in $\mu$) at 3.4–3.5, 5.6, 6.8, 6.9, 7.2, 7.3, 8.3–9.3, 9.7, 11.1, 12.0, and 12.4.

*Analysis.*—Calcd. for $C_6H_{10}O_2F_2$ (percent): F, 24.65. Found (percent): 24.71.

EXAMPLE IX

In a 6 ml. Carius tube there was placed 2.5 ml. of $CF_2=C(OC_2H_5)_2$ and 0.03 g. azobisisobutyronitrile. The tube was chilled to −190° C., evacuated and flushed with nitrogen three times and sealed. After standing 16 hours at room temperature 1.1 g. of a white polymer was obtained. This was pressed at 200° C. into a colorless, transparent film which exhibited the same infrared spectra as the homopolymer prepared in Example VIII.

EXAMPLE X

Into an evacuated 30 ml. Carius tube at −80° C., there was charged 10 ml. of $CCl_2FCF_2Cl$, 0.5 ml. $CF_2=C(OC_2H_5)_2$, 4.0 ml. (at −80° C.) $CF_2=CF_2$, and 0.02 g. $(C_2F_5COO)_2$. The tube was sealed and allowed to stand 16 hours at room temperature and then heated 16 hours at 75° C. There was obtained 1.0 g. of a white solid copolymer of TFE and $CF=C(OC_2H_5)_2$ which by elemental analysis contained 88 wt. percent TFE units and 12 wt. percent $CF_2=(OC_2H_5)_2$ units.

EXAMPLE XI

Difluoroketene dimethyl acetal

Into a 500 ml. flask equipped with a magnetic stirrer and entry tube was charged 150 ml. of diglyme and 32.4 g. of sodium methoxide. The stirred mixture was chilled, evacuated and then brought to room temperature. Tetrafluoroethylene gas was run into the mixture over a period of 5 hours at room temperature; 27 g. reacted. The products were distilled from the mixture at low temperatures and subatmospheric pressures and then subjected to vapor phase chromatography. Yields based on the tetrafluoroethylene were 50.5% $CH_3OCF=CF_2$, 44.1% dimethoxy fluoroethylene as a mixture of cis, trans $CH_3OCF=CFOCH_3$ isomers and $CF_2=C(OCH_3)_2$. By NMR and infrared spectroscopy the $CF_2=C(OCH_3)_2$ component amounted to between 4 and 6% of the dimethoxy fraction.

The perfluoropyruvyl fluoride reactant can be prepared by treating hexafluoropropylene epoxide with a carbonyl compound of the formula Y—CO—Y' wherein Y is a hydrocarbon and Y' is a hydrocarbon or hydrogen, e.g. benzophenone or benzaldehyde, at a temperature of between 100° and 300° C. For example, in a 500 ml. three-necked flask containing a gas inlet tube, a stirrer and a gas outlet tube, is placed 200 g. of benzophenone. The gas outlet tube is connected to 2 cold traps in series. The first trap is maintained at −10° C. and the second trap at −80° C. The reaction flask is heated to, and maintained at, 250° C., while hexafluoropropylene epoxide is passed through the vigorously stirred benzophenone at 80 ml. per minute, for about 5 hours. The product in both traps is combined and the perfluoropyruvyl fluoride obtained by fractional distillation.

In concentrated form and in the presence of fluoride ions, perfluoropyruvyl fluoride dimerized to

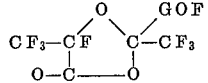

The dimer can be obtained directly by carrying out the hexafluoropropylene epoxide reaction at higher pressures. For example, 150 g. of benzophenone and 137 g. of hexafluoropropylene epoxide heated at 185° C. for 4 hours in a 330 cc. stainless steel lined autoclave will result in direct preparation of the dimer.

As many apparently widely different embodiments of this invention may be made without departing from the spirit and scope thereof, it is to be understood that this invention is not limited to the specific embodiments thereof except as defined in the appended claims.

What is claimed is:
1. Compound of the formula

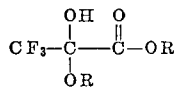

wherein R is alkyl containing up to 30 carbon atmos.

2. Compound of the formula

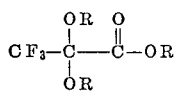

wherein R is alkyl containing up to 30 carbon atoms.

References Cited
UNITED STATES PATENTS 3,314,987　4/1967　Case _____ 260—484
3,393,228　7/1968　Braun.

FOREIGN PATENTS 763,673　12/1956　Great Britain _____ 260—484

LEWIS GOTTS, Primary Examiner

P. J. KILLOS, Assistant Examiner

U.S. Cl. X.R.

260—87.5 A, 91.1 R, 340.9, 531 R, 535 H, 539 R, 615 BF